March 6, 1928.

A. B. GOMORY 1,661,331

APPARATUS FOR WINDING ARMATURES

Original Filed Feb. 3, 1923   3 Sheets-Sheet 1

Inventor
Albert B. Gomory
By Spencer Duvall and Hardman
his Attorneys

March 6, 1928.

A. B. GOMORY 1,661,331

APPARATUS FOR WINDING ARMATURES

Original Filed Feb. 3, 1923    3 Sheets-Sheet 2

Inventor
Albert B. Gomory
By Spencer Surall and Hardman
his Attorneys

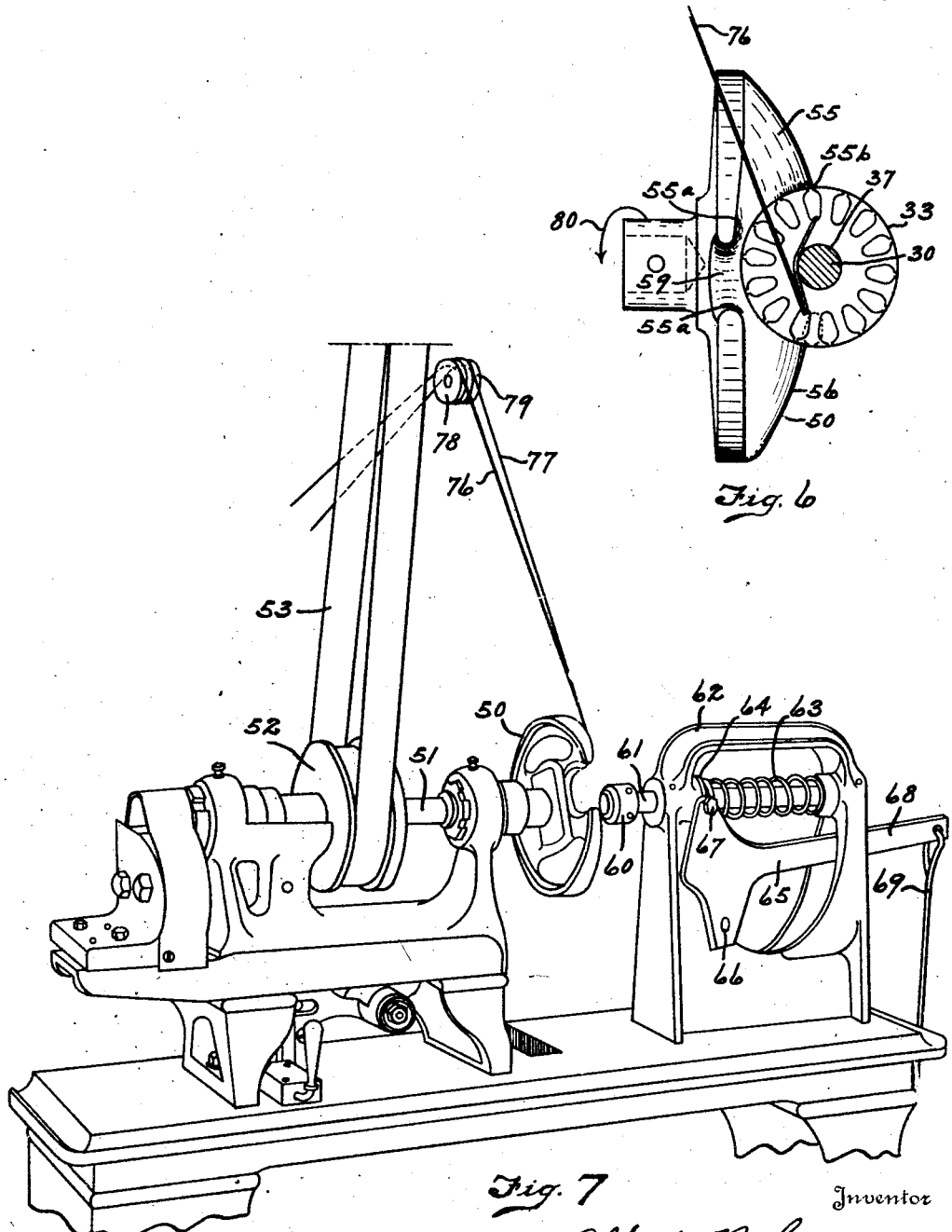

Patented Mar. 6, 1928.

1,661,331

UNITED STATES PATENT OFFICE.

ALBERT B. GOMORY, OF ANDERSON, INDIANA, ASSIGNOR, BY MESNE ASSIGNMENTS, TO DELCO-REMY CORPORATION, OF DAYTON, OHIO, A CORPORATION OF DELAWARE.

APPARATUS FOR WINDING ARMATURES.

Original application filed February 3, 1923, Serial No. 616,842. Divided and this application filed September 26, 1924, Serial No. 740,058. Renewed August 11, 1927.

This invention relates to the manufacture of armatures for dynamo-electric-machines and particularly to armatures having open slotted cores.

This application is a division of my copending application, Serial No. 616,842, filed February 3, 1923, and disclosing an improved process of winding the armature conductors upon the armature core in order to secure compactness of the windings and to facilitate the attachment of the terminals thereof to the commutator bars.

An object of the invention claimed in the present application is to provide suitable apparatus for carrying out the processes described in the original application referred to.

Other and further objects of the present invention will be apparent from the following description, reference being had to the accompanying drawings, wherein a preferred form of embodiment of the present invention is clearly shown.

In the drawings:

Fig. 6 is an edge view of the head with an armature core in position for winding;

Fig. 7 is a perspective view of the armature winding machine, this view being taken from the side of the machine opposite to that shown in Fig. 4.

Figure 1:
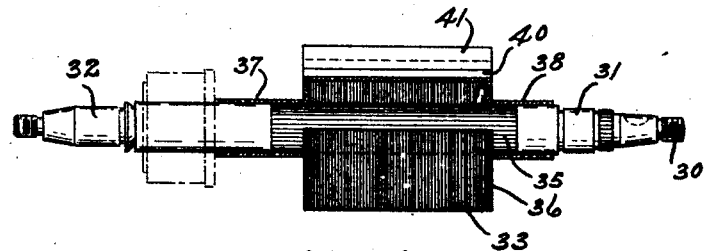
Fig. 1 is a side view partly in section of an armature core and shaft prepared for receiving the windings.
Figure 3:
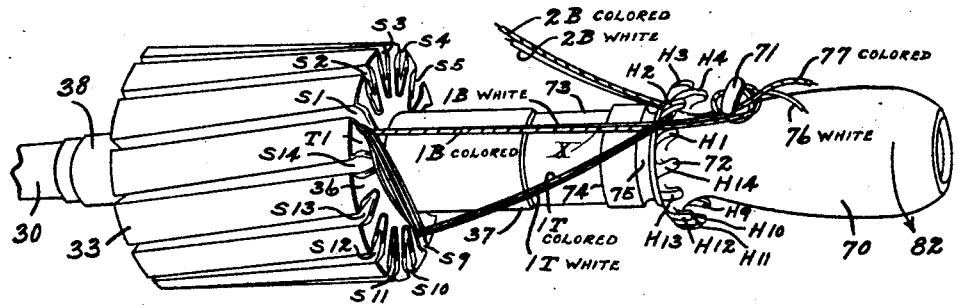
Fig. 3 is a perspective view of an armature showing the first armature coil wound thereon together with the handle assembled on the armature shaft, said handle being employed in the armature winding process.
Figure 5:
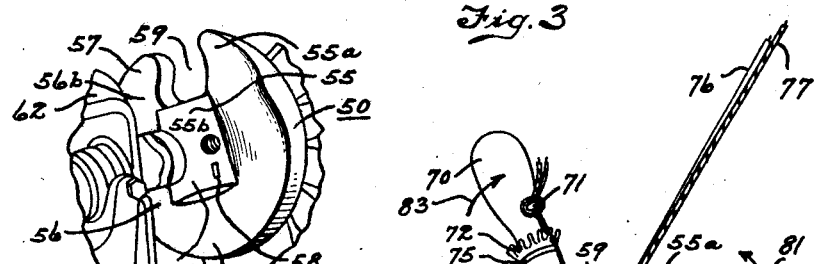
Fig. 5 is a fragmentary perspective view showing the winding head without the armature in position.

The armature shown in Fig. 1 includes a shaft 30 provided with journals 31 and 32 and a core 33 comprising a plurality of laminations shaped as shown in Fig. 3 which are assembled upon the knurled portion 35 of the shaft 30. This assembly of laminations provides a core having a plurality of teeth T1, T2, T3, etc., which include slots S1, S2, S3, etc., and as shown in Fig. 3 these slots are skewed, or arranged spirally with respect to the axis of the shaft 30 in order to reduce humming in the operation of the dynamo. The core laminations are held upon the shaft by a press fit over the knurled portion thereof, and each end of the core is provided with an insulating disc 36 of the same contour as the laminations 34. Adjacent the disc 36 the shaft 30 is provided with insulating tubes 37 and 38, formed preferably by wrapping on the shaft several turns of insulating paper, the free end of the paper strip being held down by paste. The core slots are lined with overlapping strips 40 and 41 described more fully in my copending application, Serial No. 751,183 filed Nov. 20, 1924.

Figure 4:
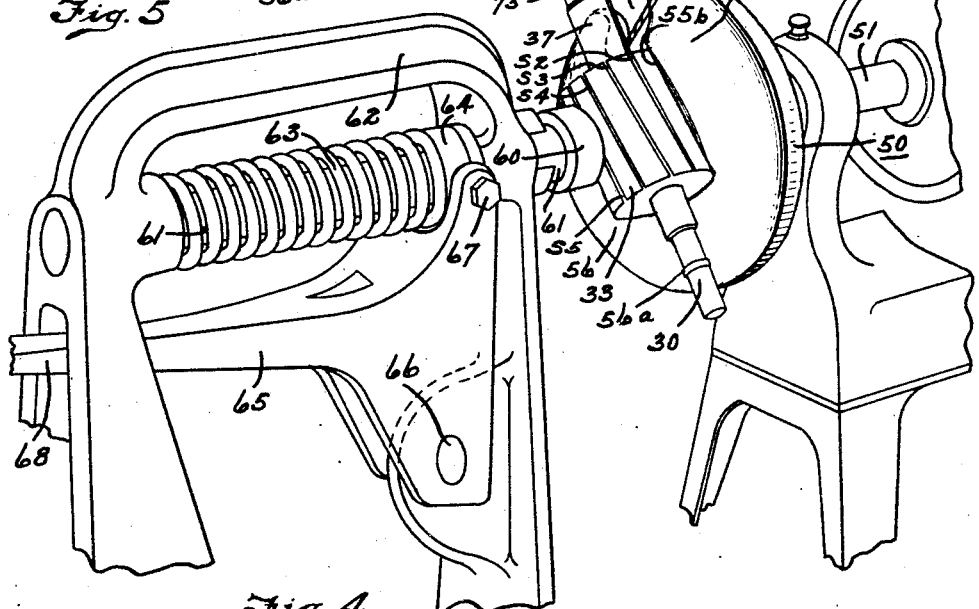
Fig. 4 is a fragmentary perspective view of the machine employed for winding armatures.

Winding of the armature is performed preferably by the use of a power winding machine of the type shown in Figs. 4 and 7. This machine includes a winding head 50 mounted preferably upon a horizontally disposed spindle 51 which is driven in any suitable manner as by pulley 52 and belt 53 which is connected with some source of power not shown. The winding head 50 includes a cylindrical recess 54 adapted to receive the armature core 33, and diametrically opposite scoop-like portions 55a and 56a merging into cheeks 55 and 56. The portion 55a is notched at 59 for a purpose to be described. The cheeks 55 and 56 merge with the cylindrical surface 57 of recess 54 at the edges 55b and 56b, respectively. The edges 55b and 56b are angularly spaced and skewed with respect to the axis of the core 33 so that the wires 76 and 77 (to be described) will be guided into the skewed slots of the armature core 33 having a predetermined spacing when the core is revolved by the head 50. The spacing or pitch of the windings is for example, seven, counting the slots into which the wires are directed and the five intervening slots. The wires 76 and 77 which are unwound from supply reels during the winding of wire upon a core, are led over guide wheels (not shown) located preferably above winding machine and at such an angle thereto that, as an end of the armature shaft approaches the wires 76 and 77, these wires will not be engaged by the shaft until after a scoop portion of the head has engaged the wires. Referring to Figs. 4 and 6, it is evident that as the head 50 revolves as indicated by arrow 80 in Fig. 6, the scoop portion 55a will cause the wires to be packed around the insulation 37 at the commutator end of shaft 30. The wires 76 and 77 are held taut by a suitable tensioning device, and the minimum tension will occur when the wires are not engaged by the winding head. As the cheeks 55 and 56 cam the wires into the armature slots the tension will be increased due to the fact that the wires are pushed away from their normal position of inclination thus causing the unreeling of the wires to be accelerated. The tension applied to the wire will vary according to the size of wire.

It is apparent from the foregoing that the wire will be held in engagement with the scoop portions at the proper time and with the cheek portions so that the head may function properly to direct the wire into the slots. The cheek portions and the scoop portions are shaped so that there will be a substantial line of contact between the wires and the head. In this manner the pressure between the wires and head will be distributed over a substantial portion of the wire so that the pressure applied to the wire by the head at any point of contact will not be sufficient to injure the insulation of the wire. For example, the line of contact between the wire and cheek 55 extends from the edge 55b to the periphery of the head.

The armature core is maintained upon the winding head by means of a presser block 60 which is rotatably mounted on a rod 61 slidably supported by frame 62. A spring 63, bearing at one end against frame 62 and at the other against a collar 64 carried by rod 61, yieldingly presses the block 60 against the armature core. A lever 65 fulcrumed at 66 is connected at 67 with collar 64. By moving the free end 68 of the lever down, preferably by a pedal (not shown) connected with a strap 69 (Fig. 7), the block 60 may be withdrawn from the armature core to permit withdrawal of the core from the winding head.

The cylindrical portion 57 of the head 50 which defines the bottom of the recess 54, is provided with an indexing lug 58 adapted to project into that slot of the armature core which is midway between the slots which are located adjacent the cheeks 55 and 56. In starting the winding operation the slot S1 for receiving coil No. 1, will be aligned with cheek 55 while slot S9 will be aligned with cheek 56. When the armature is properly located within the recess 54, the lug 58 will extend in the slot S12. As the armature coils are successively wound on the core, slots S2, S3, S4, etc., will be brought into alignment with the cheek 55, and the lug 58 will be progressively inserted into the slots S13, S14, S1, etc., respectively, as will appear hereinafter.

Figure 2:
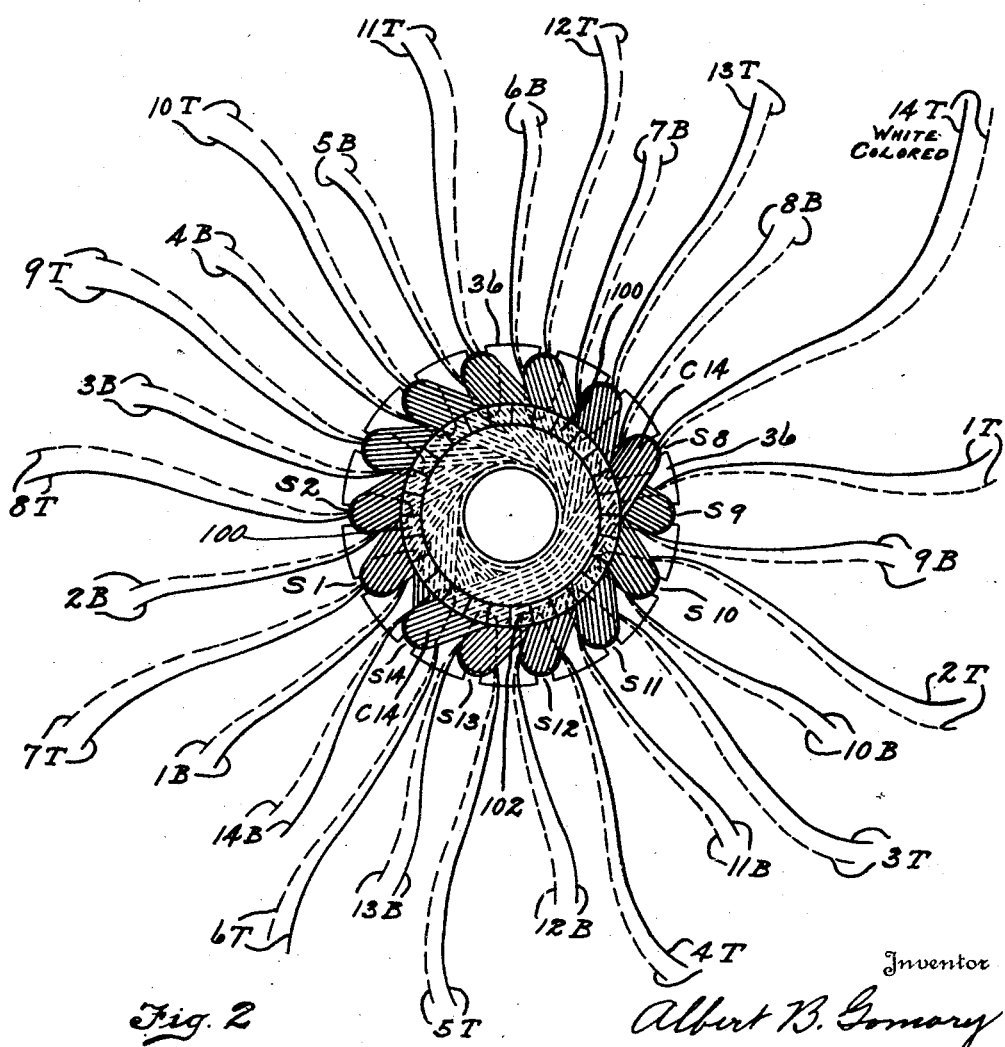
Fig. 2 is an end view of the armature after the windings have been applied and the commutator has been mounted upon the armature shaft.

The wires for forming the armature coils are unwound from the spools or reels of wire and each coil includes a plurality of turns, six turns in the example given. Two wires are wound upon the core simultaneously, and these wires are distinguished by providing one with white insulation and the other with colored insulation. In Fig. 2 the wire having white insulation is indicated by the continuous line, and the wire having colored insulation is indicated by the broken line. The inside or bottom terminals of the first turns of each pair of coils are designated by 1B white and 1B colored, while the ends of the last or top turns of each pair of coils are designated by 1T white and 1T colored, respectively. It is the aim of the invention to wind the armature in such a manner that the terminals of the coils will not be packed down against the shaft insulating tube 37 as the coils are successively wound upon the core but will be packed by the overlapping portions of the coils against the core insulating disc 36. When the armature disclosed is completely wound there will be 14 coils of wire with white insulation and 14 coils of wire with colored insulation, making a total of 28 coils and 56 coil terminals which are to be connected with the 28 commutator bars after the winding process is complete. By referring to Fig. 2, it will be noted that all of these terminals are brought out along the core insulating disc 36 and that none of these terminal wires have been packed down against the armature shaft during the winding process.

The bottom terminals of the coils are designated 1B, 2B, etc., while the top terminals are designated 1T, 2T, etc. It will be noted that the bottom terminals are cut off shorter than the top terminals, and since the two coils which are wound simultaneously are distinguished by the color of the insulation, there will be no difficulty in identifying the terminals of the different coils. There will be no difficulty in locating the last coils wound on, namely coil 14 white and coil 14 colored, because, as shown in Fig. 2, these coils overlap all of the other coils and their top terminals are cut off longer than the other top terminals.

In order to produce these results, the wires joining the progressively wound armature coils are formed into loops, and these loops are severed in two places differing in distance from the armature core whereby to make the top terminals or leads from armature coils longer than the bottom leads. Between successive winding operations some of these leads are bent away from the plane of the winding of the coils so that the overlapping portions of the coils cannot push the previously formed coil terminals down against the insulating tube 37. In other words, the winding must proceed in such a way that the coil terminals can be brought out alongside the insulation disc 36, and so as not to be pressed down by the successive coil winding operations against the tube 37.

In order to facilitate this process of winding, there is provided a handle 70 which is provided with a central bore adapted to fit over one end of the armature shaft as shown in Figs. 3 and 4. The handle is provided with a peg 71 and with a plurality of hooks 72 each extending toward the operator who is on the same side of the machine as shown in Fig. 7 or on the opposite side of the machine as shown in Fig. 4. The drawings show a handle having 14 hooks, one for each of the 14 slots of the armature core which has been selected as an example to illustrate the winding process. The handle includes a sleeve 73 having an internal diameter sufficient to receive that portion of the armature to the left of the armature insulation 37 shown in Fig. 1 but the internal diameter of the sleeve 73 is less than the external diameter of insulation 37 so that this insulation acts as a stop to limit the movement of the handle 70 toward the armature core. The sleeve is provided with a shoulder 74 which serves as a guide for the blades of a pair of wire snippers so that the bottom leads or ends extending from the first turns of the coils will all be severed off a uniform distance from the armature core. The sleeve 73 is provided with a groove 75 which serves as a guide for the snipper blades to facilitate cutting off the top leads or ends from the last turns of the coils at a uniform distance from the armature core and so that the top leads or terminals will be longer, as measured from the core, than the bottom leads.

The white thread covered wire 76 and the colored thread covered wire 77 are pulled off the supply reels and are roved over the pulleys 78 and 79, respectively. The ends of these wires are twisted around the peg 71 to to start the winding operation. The spindle 51 is rotated in the direction of arrow 80 in Fig. 6 and arrow 81 in Fig. 4, that is, the handle 70 moves down in front of the operator as it comes between the operator and the spindle 51 during the rotation of the handle about the axis of the spindle. As the winding head 50 rotates, the cheeks 55 and 56 will guide the wires 76 and 77 into certain spaced armature slots. Fig. 3 shows the first pair of coils to be wound on. The first or bottom turn of each coil extends through slot S1 and across the back of the core (the face of the core remote from the commutator) and then toward the commutator end of the armature through the slot S9. In the example given each coil includes 6 turns. The bottom terminals of the pair of coils are designated by 1B white and 1B colored in Fig. 9 and include that portion of the wire between the peg 71 and the slots S1. The leads from the last turns of the first coil to be wound on are designated 1T white and 1T colored in Fig. 3, and these ends are hooked over the hook H2 and these wires which proceed from the hook H2 will form the bottom leads of the second coil wound on. Therefore these leads are designated 2B white and 2B colored. After the first coil has been wound on, the ends of wires 76 and 77 are unwound from the peg 71 and are wrapped around the hook H1.

Before winding on the second pair of coils, the presser block 60 is retracted from the armature to permit moving the armature out of the recess 54 sufficiently to clear the indexing lug 58. The operator turns the core in a direction of the arrow 82 in Fig. 3 or 83 in Fig. 4 so as to line up the slot S2 with the cheek 55 and the slot S10 with the cheek 56. Then the lever 65 is released to permit the pressure head 60 to bear against the core.

If the winding of the second pair of coils were to proceed without clipping the coil terminals 1B white and 1B colored, it is apparent from Fig. 3 that a portion of the second coil wound on would overlap these leads or terminals because a portion of the coil would extend across the core insulating disc 36 between the slots S2 and S10. This portion would press the terminals 1B white and 1B colored down against the insulating tube 37. If none of the coil leads were clipped during successive coil winding operations, and the clipping of the leads were to be postponed until all of the coils were wound on, the result would be that the overlapping portions of these coils, which are clearly shown in Fig. 2, would press all of the bottom leads of the coils and the first seven pairs of top leads down against the insulating tube 37 whereas the last seven pairs of top leads would come out on the outside. Such a construction would require the placing of the commutator at such a distance from the core as to permit bringing these bottom leads and top leads in the first seven coils around the end of the armature coils and the space would have to be sufficient for properly insulating these leads from the overlapping portions of the coils, and there would need to be some abrupt bends made in some of the leads before they are brought out to their respective commutator bars. Such a construction would take up more room than necessary and would require additional labor to apply the necessary insulating material. But if the coil leads are all brought out alongside the core insulating disc 36, that is packed in between this disc and the overlapping portions of the armature coils, then the insulation of these leads and their attachment to the commutator bars will be much simplified and the space required will be materially reduced. Therefore before any subsequent pair of coils are wound on, the bottom leads of the preceding pair of coils are severed by cutting these wires at X in Fig. 3 which is done by applying the wire snippers along the edge of the shoulder 74. For example, before winding the second pair of coils the severed ends 1B white and 1B colored are bent alongside the disc 36 and out through the notch 59 which has been provided in the head 50 in order to facilitate the bending of the severed terminals out of the plane of subsequent coil winding operation.

The winding process carried out by means of this apparatus is described in detail in application, Serial No. 616,842. Briefly stated, the process includes forming a loop between successive coil winding operations by bringing the wires around the respective hooks 72 or H1 to H14, there being one hook in alignment with each core slot. Each loop provides the top lead of the preceding coil and the bottom lead of the subsequent coil. Before coils 2 to 14 are wound on, the loops are severed, respectively, at X in Fig. 3 to provide the bottom leads C1 to C13, respectively. These bottom leads are successively bent away from the region of winding. Since coil C14 is the last one to be wound, its bottom lead 14B is severed after the winding operation.

Until the first eight coils are wound on, the top leads of the preceding seven coils need not be clipped. But before the ninth coil is wound, the top lead 1T of the first coil C1, must be severed at the groove 75 in Fig. 3 and be thrown out through the notch 59. With the exception of the top lead 14T of the fourteenth coil, the top leads of the coils are severed at 75 so that the top leads will all be longer than the bottom leads.

The top leads of the first seven coils might all be severed at groove 75 before the ninth coil is applied. If this is not done, lead 1T must be severed and bent out along disc 36 before the ninth coil is applied, lead 2T before the tenth coil, etc. The terminals 7T to 14T need not be severed at groove 75 until the end of the winding operation. Lead 14T is not severed at groove 75 but is cut off longer than the others in order to make it clearly distinguishable, and lead 14T is wrapped around the other leads to hold them in position after the armature is removed from the winding machine.

By reason of this color and length the bottom and top leads of the 28 coils are clearly distinguishable and may readily be attached to the proper bars of the commutator 100, shown in Fig. 2.

It is apparent that the winding process described can be applied to an armature including a core having any number of slots, and the pitch of the armature coils may be different from that shown in the drawings. In any case the bottom lead of any coil must be severed and bent away from the winding region, either out through the notch in the winding head or away from the winding head as may be convenient, before the next succeeding coil is wound on. Then the top lead of the Nth coil must be severed before the $(N+S-T)$th coil is wound on, N being the order number of the coil, S being the number of core slots, and T the number of teeth included by or embraced by a coil. For example, if there are fourteen slots and six teeth are embraced by the coil, then the top lead of the first coil must be cut before the $(1+14-6)$th or 9th coil is wound on, the top lead of the second coil must be cut before the $(2+14-6)$th or 10th coil is wound on etc. Obviously if only fourteen coils are wound on, then after the fourteenth coil has been wound, the clipping of the coils after the sixth will be done at the end of the winding operation.

It is also apparent that apparatus claimed hereinafter is applicable to armatures other than the one disclosed, and that the apparatus may readily be constructed to accommodate armatures of different diameters, numbers of teeth, and winding pitch.

While the form of embodiment of the present invention as herein disclosed, constitutes a preferred form, it is to be understood that other forms might be adopted, all coming within the scope of the claims which follow.

What is claimed is as follows:

1. In a machine for winding armatures, the combination with a rotatable shaft; of a winding head mounted thereon and provided with a recess having a cylindrical wall adapted to receive an open slotted armature core assembled on an armature shaft, and having cheeks on opposite sides of the recess said cheeks merging with said cylindrical wall at edges angularly spaced in conformity with the angular spacing of certain armature core slots, and having scoop portions adjacent the ends of the recess which are spaced from the armature shaft, one of said scoop portions having a notch extending from the periphery of the head to facilitate moving the armature coil ends away from the winding region; and means for maintaining an armature within said recess while permitting it to be rotated.

2. In a machine for winding armatures, the combination with a rotatable shaft; of a winding head mounted thereon and provided with a recess adapted to receive an open-slotted armature core assembled on an armature shaft, and having means for guiding wire into certain spaced armature slots, and having scoop portions adjacent the ends of the recess which are spaced from the armature shaft, one of said scoop portions having a notch extending from the periphery of the head to facilitate moving the armature coil ends away from the winding region; and means for maintaining an armature within said recess while permitting it to be rotated.

3. In a machine for winding armatures, the combination with a rotatable shaft; of a winding head mounted thereon and provided with a recess adapted to receive an open-slotted armature core assembled on an armature shaft, and having means for guiding wire into certain spaced armature slots, said guiding means including surfaces extending from the recess toward the periphery of the head and provide a line of contact of substantial length between the wire and the winding head whereby to distribute the pressure between the wire and the head over a substantial portion of the wire to reduce damage to the insulation thereon; and means for maintaining an armature within said recess while permitting it to be rotated.

4. In a machine for winding armatures, the combination with a rotatable shaft; of a winding head mounted thereon and provided with a recess adapted to receive an open slotted armature core assembled on an armature shaft, and having means for guiding wire into certain spaced armature slots, and having an indexing lug extending from the wall of said recess to project into one of the core slots; and means for maintaining an armature within said recess while permitting it to be rotated.

5. A tool for the manufacture of a wire wound armature including a shaft and an open slotted core assembled thereon comprising a hollow sleeve adapted to fit over an end of the armature shaft and having a plurality of hooks equal in number to the number of armature core slots, said hooks being angularly spaced in conformity with the angular spacing of said slots, each hook being adapted for use in forming a loop of wire between windings successively applied upon the armature core.

6. A tool for the manufacture of a wire wound armature including a shaft and an open slotted core assembled thereon comprising a hollow sleeve adapted to fit over an end of the armature shaft and having a plurality of hooks equal in number to the number of armature core slots, said hooks being angularly spaced in conformity with the angular spacing of said slots, each hook being adapted for use in forming a loop of wire between windings successively applied upon the armature core, said sleeve having annular provisions located at different distances from an end of the sleeve, each of said provisions adapted to guide the blades of a pair of wire cutters whereby certain branches of these loops may be severed at a uniform distance from the core, the severing of the loops freeing the hooks and the tool from the work.

7. Apparatus for manufacturing armatures including a shaft attached to an open-slotted core, comprising in combination, means for receiving the core and rotating it about an axis at right angles to the armature shaft and for guiding wire into slots having a certain spacing, and a tool adapted to be mounted upon the armature shaft and rotate therewith during the winding operation, said tool having a plurality of projections spaced from the armature core, the projections progressively receiving the wire between successive coil winding operations, whereby loops connecting the coils are formed outside the core.

8. Apparatus for manufacturing armatures including a shaft attached to an open-slotted core, comprising in combination, a winding head for receiving the core and rotating it transversely to its shaft axis and for guiding winding into core slots having a certain spacing, said head having a notch located adjacent the shaft when the core is received by the head, and a tool adapted to be mounted upon one end of the armature shaft and carrying means for facilitating the formation between coil winding operations, of loops joining the coils, said tool having provisions to facilitate cutting the loops to form leads, the said notch being adapted to receive certain leads into order to bend the leads away from the region of winding of succeeding coils.

9. Apparatus for manufacturing armatures including a shaft attached to an open-slotted core, comprising in combination, a winding head for receiving the core and rotating it transversely to its shaft axis and for guiding winding into core slots having a certain spacing, said head having a notch located adjacent the shaft when the core is received by the head, and a tubular tool adapted to be mounted upon one end of the armature shaft and provided with projections corresponding in spacing with the core slots, each projection being adapted to receive the wire joining successive coils whereby to form a loop outside the core, the notch of the head being adapted to receive a severed portion of the loop forming a coil lead in order to locate this lead out of the region of winding of the next succeeding coil.

10. Apparatus for manufacturing armatures including a shaft attached to an open-slotted core, comprising in combination, a winding head for receiving the core and rotating it transversely to its shaft axis, and for guiding winding into core slots having a certain spacing, said head having a notch located adjacent the shaft when the core is received by the head, and a tubular tool adapted to be mounted upon one end of the armature shaft and provided with projections corresponding in spacing with the core slots, each projection being adapted to receive the wire joining successive coils whereby to form a loop outside the core, the tool having annular provisions spaced from the core for guiding the blades of wire cutters whereby certain branches of the coil loops may be severed at a uniform distance from the core, the notch of the head being adapted to receive a severed portion of the loop forming a coil lead in order to locate this lead out of the region of winding of the next succeeding coil.

In testimony whereof I hereto affix my signature.

ALBERT B. GOMORY.